United States Patent [19]

Bubik et al.

[11] 4,335,772
[45] Jun. 22, 1982

[54] TIRE CHANGING MACHINE

[75] Inventors: Leslie Bubik, Toronto; Stanley B. Barclay, Mississauga; Eugene L. Knaitner, Weston; Frederic D. M. Williams, Mississauga; Bernard D. Alm, Willowdale, all of Canada

[73] Assignee: FMC Corporation, Chicago, Ill.

[21] Appl. No.: 208,106

[22] Filed: Nov. 18, 1980

Related U.S. Application Data

[63] Continuation of Ser. No. 3,823, Jan. 16, 1979, abandoned.

[30] Foreign Application Priority Data

Jan. 23, 1978 [CA] Canada ................... 295475

[51] Int. Cl.³ .............................................. B60C 25/06
[52] U.S. Cl. ..................................................... 157/1.28
[58] Field of Search .................... 157/1.17, 1.24, 1.26, 157/1.28

[56] References Cited

U.S. PATENT DOCUMENTS

| | | | |
|---|---|---|---|
| 3,180,392 | 4/1965 | Foster | 157/1.28 |
| 3,581,796 | 6/1971 | Alm | 157/1.28 |
| 3,780,785 | 12/1973 | Schultz et al. | 157/1.28 X |
| 3,877,505 | 4/1975 | Besuden et al. | 157/1.28 |
| 4,114,672 | 9/1978 | Holladay et al. | 157/1.24 |
| 4,168,733 | 9/1979 | Gwaltney | 157/1.28 |

Primary Examiner—James G. Smith
Attorney, Agent, or Firm—Henry M. Stanley; Richard B. Megley

[57] ABSTRACT

A tire changing machine for breaking tire beads on a wheel rim having a drop center is disclosed. The machine includes a bead breaker mechanism including upper and lower bead breaking shoes, driving levers for each of the bead breaking shoes, and horizontally and vertically adjustable mechanism for positioning the upper bead breaker, which mechanism is frictionally locked where manually adjusted. The tire changing machine also includes a rack and pinion drive arrangement for centrally located rotating tire tool driving post. The rack is driven by the upper bead breaking drive lever. Dual power cylinders are provided, one to drive the lower bead breaker drive lever and one to drive the upper bead breaker drive lever. The drive levers are driven bi-directionally by their respective cylinders. The center post is also driven bi-directionally by the upper bead breaker power cylinder. The mechanism also includes levers and pivots appropriately attached to the upper bead breaking mechanism for guiding the leading edge of the upper bead breaker through a locus inwardly toward the bead of a tire and therefore toward the drop center of a wheel rim on which the tire is mounted. The machine is particularly useful for changing tires on magnesium and other brittle alloy wheel rims while avoiding rim damage.

12 Claims, 11 Drawing Figures

TIRE CHANGING MACHINE

This is a continuation of application Ser. No. 003,823 filed Jan. 16, 1979, now abandoned.

BACKGROUND OF THE INVENTION

This invention relates to tire-changing machines and more particularly to such machines as are provided with a stand for supporting the tire to be changed in a horizontal position with upper and lower bead breakers which separate the tire bead from the wheel rim.

The prior art, as least insofar as the patent literature is concerned is voluminous. Certain patents are directed to upper bead breaker mechanisms; other patents to the lower bead breaker mechanism; and further patents to mechanisms for driving a central post and still further patents to combinations of these and other features.

The most relevant prior art known to the inventor is as follows:

| U.S. PAT. NO. | ISSUED | INVENTOR |
| --- | --- | --- |
| 3,847,198 | Nov. 12, 1974 | Brosen, Jr. |
| 3,807,477 | April 30, 1974 | Curtis |
| 3,742,999 | July 3, 1973 | Myers, Jr. |
| 3,358,730 | Dec. 19, 1967 | Mandelko |
| 3,255,800 | June 14, 1966 | Strang et. al. |
| 3,212,552 | Oct. 19, 1965 | Foster |
| 3,165,142 | Jan. 12, 1965 | Tabordon |
| 3,158,190 | Nov. 24, 1965 | Foster |
| 3,064,718 | Nov. 24, 1962 | Brosene, Jr. |

Elements of these structures have been and are still employed in commercially available machines, for example the double lower bead breaker shoe, of U.S. Pat. No. 3,158,190, the pneumatically powered machine with the single lever co-action between the upper and lower bead breakers and the central drive post of U.S. Pat. No. 3,212,552; the hook-shaped upper bead breaker of U.S. Pat. No. 3,255,800; and the various mechanisms of U.S. Pat. No. 3,847,198; U.S. Pat. No. 3,807,477 and U.S. Pat. No. 3,742,999.

However, the development of alternative wheel rims such as magnesium or alloy wheels together with the wider ranges of sizes of wheel rims has made the use of these machines increasingly difficult and has resulted in unsatisfactory performance.

For example the standard wheel structure usually employs a flange on the wheel rim of between $\frac{3}{8}''$ and $\frac{1}{2}''$ as compared to the wider flange of $\frac{3}{4}''$ on alloy wheels. With many conventional tire changers of either the single or double lower bead breaker type the locus followed by the leading edge of the lower bead breaker shoe is usually an arc of a circle. While the wheel-receiving table top may accommodate different sizes of wheel rims such a path does not permit accommodation of wheel-rim flanges of differing width. Thus while such a lower bead breaker may effectively break a bead on a standard wheel rim it will frequently hit the wheel rim with either the first or second lower bead breaker shoe. Since the tire obscures the view of the operator considerable damage can be done to the alloy or magnesium wheels. The operator may not detect the wrong engagement and the rim may be fractured or dented.

A similar problem arises with upper bead breakers of the prior art. These may take the form shown in U.S. Pat. No. 3,255,800 to Strang previously referred to, or they may have the form shown in U.S. Pat. No. 3,807,477. The two types referred to are entirely different in structure and action and give different difficulties.

With the second type the column which supports the upper bead breaker is pivoted to move about a single pivot point and again the bead breaker arm moves through an arc. In this type of structure the "nose" of the bead breaker arm engages the bead or the sidewall of the tire. The arcuate motion of the bead breaker tends to pull the bead breaker nose outwards and downwards and the engagement between the bead breaker "nose" and the side wall is not too secure. This frequently results in the "nose" sliding off or a downward and outward pull being exerted on the wall. This action is not always effective in breaking the tire bead at the rim.

In the first mentioned structure a nose is provided to engage the inner surface of the wheel rim. The rotational pull on the bead-breaker column is translated into an outward horizontal force against the wheel rim and a downward force against the tire sidewall or bead. The horizontal force may be as great as 25,000 lbs. This force frequently damages the wheel rims particularly if they are of alloy.

The "nose" of this first-mentioned upper bead breaker is also provided with a secondary arm which is spring-loaded to maintain it in engagement with the tire bead and follow the tire bead into the wheel well. However, the mechanism does not so function in practice throughout the travel of the bead breaker column. Frequently, after the upper bead breaker column has completed part of the travel the bead will not break because the vertical force is not sufficient to break the bead. The operator then drops the upper bead breaker column relative to the turning lever and repeats the bead-breaking procedure so that the bead can be broken. The upper breaker mechanism which has just been discussed also has a further difficulty in that the adjustments available to the operator are limited by the provision of limited pivot points at the bottom of the vertical column and relatively fixed relationship of the bead breaker shoe to the "nose" which is itself pivoted at one point. No meaningful lateral adjustment is available without changing the force exerted on the bead to break it.

Machines of the prior art have three further principal shortcomings, their complexity and cost; and a further operational problem. The second of these arises because the centre post driving mechanisms usually drive through a limited range and since they usually rely on a simple hydraulic power source are provided with a spring return to reverse the motion. However, in operation when the operator inserts the tire tool in the bead and over the centre post and rotates the tire tool to pry the bead from off the wheel rim, because the bead is normally broken in the bead-breaking operation over a limited range, the tire tool frequently binds between an unbroken section of rim and bead. The result is that the tool is stuck and the spring return does not provide sufficient power to release the tire tool so that another attempt can be made.

With these difficulties in mind it is the object of the present invention to provide an improved tire-changing machine which is economical to build, easy to operate and which may be operated with a minimum of damage to wheel rims.

In accordance with the present invention there is provided in a tire-changing machine for breaking tire beads on a wheel rim having a drop centre an improved bead breaker mechanism which comprises: power means, a bead breaking shoe having a leading edge engageable with a tire bead; bead breaking shoe support means connected to said power means; and guide means for guiding said leading edge of said bead breaking shoe through a locus inward toward said tire bead and said wheel rim drop centre.

In accordance with another aspect of the present invention there is provided in a tire changing machine a frame mounting a wheel rim in a generally horizontal position, an upper bead breaker support column mounted generally vertically in said frame, an upper bead breaker shoe, means for mounting said shoe to said support column so that said shoe extends generally laterally therefrom said mounting means comprising a column lock member having an upper wall and a lower wall spaced from said upper wall, said walls each having a thickness significantly less than the spacing therebetween, said walls having aligned apertures which are slightly larger than a cross section of said support column for receiving said column therethrough, whereby force applied to the shoe having a force component parallel to the longitudinal axis of said column urges opposite edges of said aligned apertures to assume high pressure contact with adjacent surfaces on said column providing frictional resistance to movement of said means for mounting along said column.

Further in accordance with the present invention there is also provided in a tire-changing machine power means, an upper bead breaking mechanism, a lower bead breaking mechanism, lever means connected between said power means and said bead breaking mechanism for actuating said bead breaking means in response to actuation of said power means; and drive means operably connected with lever means for rotatably driving said centre post in a first direction and a second reverse direction about a vertical axis.

There is also provided in a tire-changing machine having a frame, a platform for receiving a wheel rim having a drop centre mounted on top of said frame, and a rotatable shaft having a free upper end extending from said table, the improvement which comprises a pair of reversely coacting fluid motors each with pistons, the piston of a first fluid motor being operatively connected with a first bead breaker shoe and the piston of a second fluid motor being operatively connected to a second bead breaker shoe; one of said pistons being further operatively connected to said rotatable shaft to drive said shaft in first and second reverse directions about a vertical axis, and individual guide means for guiding the travel of each of said bead breaker shoes in a locus inward toward said wheel rim drop centre.

The foregoing objects and features of the present invention will be more fully appreciated from the following description and drawings in which a specific embodiment is described by way of example and in which:

It will be understood that structural details such as bushings, bearings, screws, nuts and bolts and the like are provided where standard engineering practice would require. Such details have been omitted from this description because their illustration and presence would detract from the essential structural details and hinder rather than help in the understanding of the drawings and description.

Figures 1, 4:
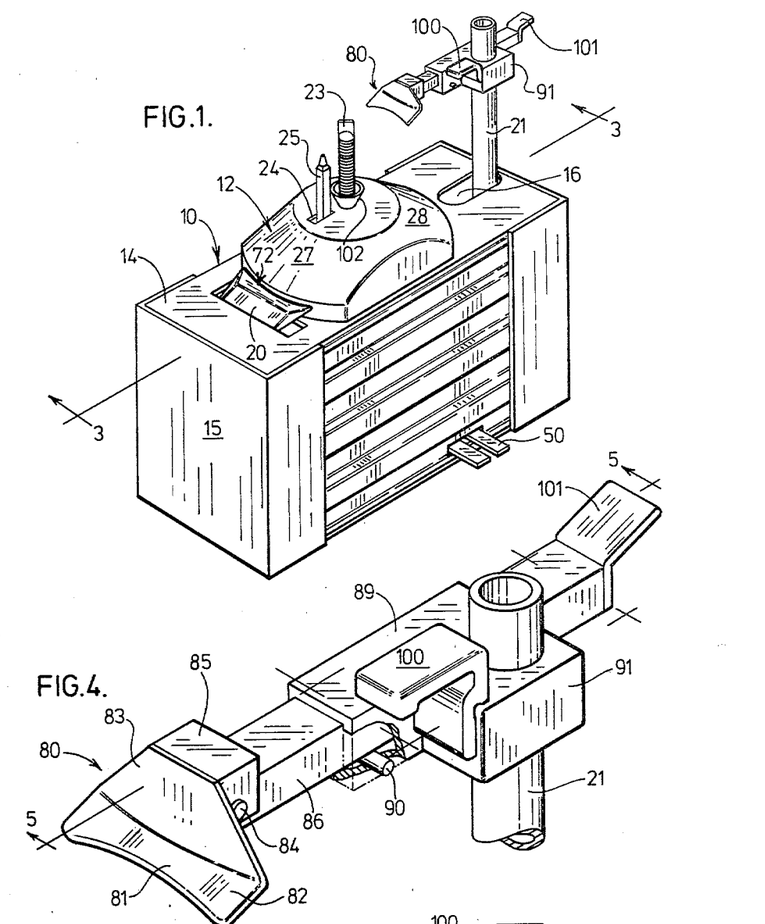
FIG. 1 is a general perspective view of a tire changer in accordance with the present invention.
FIG. 4 is a general perspective view of an upper bead breaker in accordance with the present invention.

Referring now to the drawings, in FIG. 1 a tire-changing machine in accordance with the present invention is indicated generally at 10. A shown it comprises a casing or cover 11 surrounding a frame upon which is provided a deck 14 with a wheel rim receiving platform 12. The wheel rim platform 12 has generally frustro-conical shape with inwardly sloping surfaces 27 and 28 on the ascending plane. It has been found that in such models of this present machine as are provided with inflating air tubes as shown at 13 in FIG. 3 that the conical configuration in combination with the adjacent undersurface of the tire wall lead to a more efficient means of injecting air under pressure into the tire upon inflation than other forms which are circular in geometry. In deck 14 there are two slots one extending transversely as at 15 adjacent platform 12 and one 16 on the remote side of platform 12 from slot 15 and extending along the longitudinal axis of the deck 14.

From slot 15 a lower bead breaker shoe 20 projects when normally at rest and from slot 16 an upper bead breaker support arm 21 extends.

From the upper surface of platform 12 a rotatable shaft 23 extends vertically and on one side thereof, through slot 24 a pin 25 extends. Pin 25 is adapted to engage a bolt hole in a wheel rim to help secure the wheel rim against relative rotational movement thereto.

Figure 2:
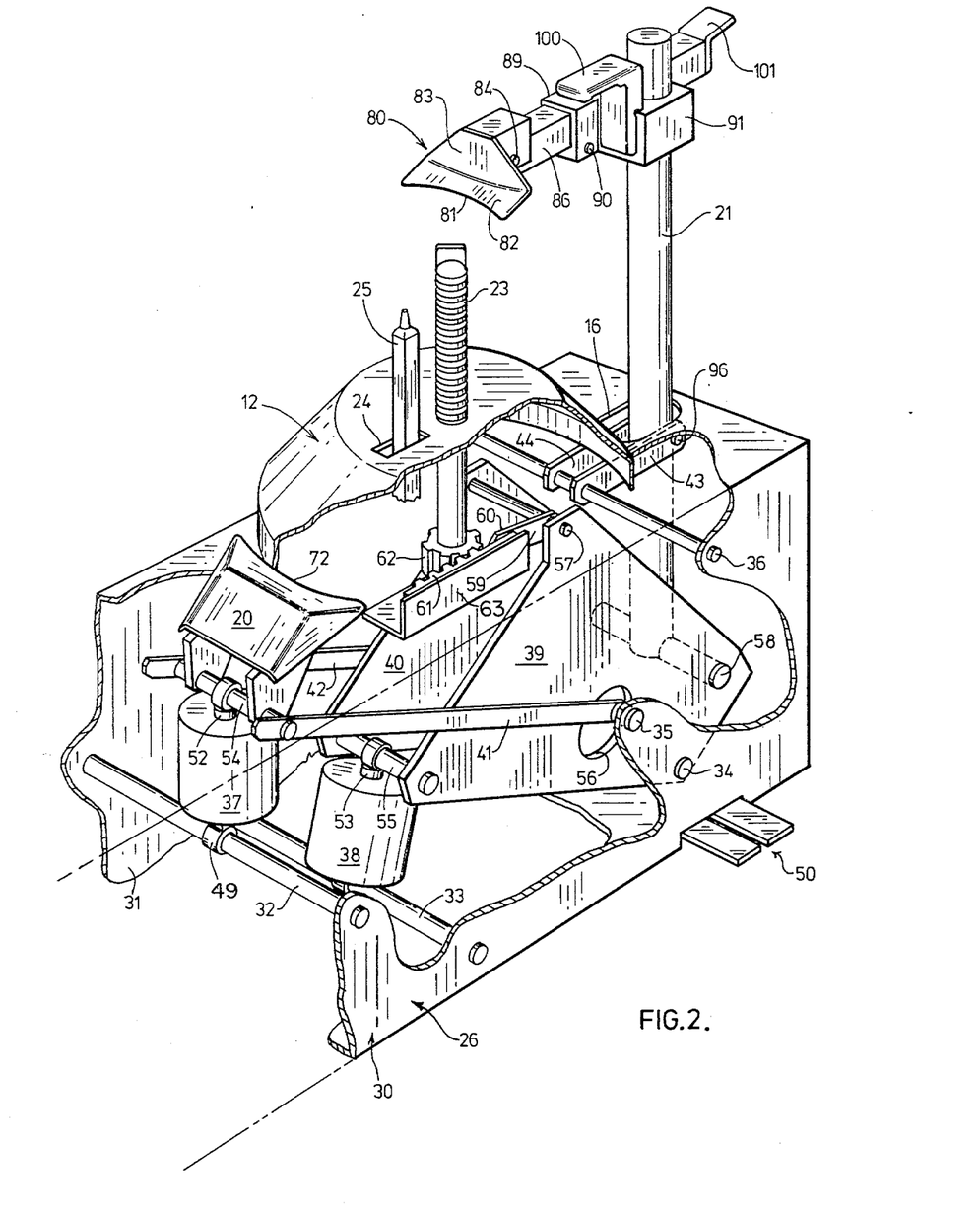
FIG. 2 is a general perspective view with the cover removed and partially broken away with conventional structural elements omitted for the purposes of illustrating more clearly the spatial relationship between those parts which constitute the invention.

A frame 26 has a generally rectangular form fabricated from square tubing and is provided with a pair of side plates 30 and 31. Deck 14 is mounted on the frame. The plates 30 and 31 support and are spaced apart by transversely extending rods such as 32, 33, 34, 35 and 36. These rods also serve as pivotal mounts for air/hydraulic cylinders 37 and 38; the upper bead breaker levers 39 and 40; the lower bead breaker guide arms 41 and 42; and the upper bead breaker guide arms 43 and 44, respectively.

The air/hydraulic cylinders 37 and 38 are connected, in reverse respectively, to an air supply by air hoses 45 and 46 and to each other by an oil hose 47.

The air supply is in turn controlled by a valve operated by foot pedal 50 in a conventional manner.

Cylinders 37 and 38 are each pivotally mounted through collars 49 and 51 on rods 32 and 33, respectively, and their respective pistons 52 and 53 are also pivotally connected to rods 54 and 55. Rod 54 is itself pivotally mounted on the lower bead breaker guide arms 41 and 42.

The upper bead breaker levers 39 and 40 are a pair of parallel plates pivotally mounted on rod 34 as mentioned previously. These plates each are irregular in form and are provided with openings such as at 56 through which rod 35 which is the pivotal mounting for the lower bead breaker guide arms 41 and 42 passes and supports these guide arms 41 and 42 outward of plates 39 and 40.

Rod 55 at the left hand end of plates 39 and 40 spaces them apart and rods 57 and 58 also serve this purpose. Rod 58 is pivotally mounted and is also pivotally connected adjacent to the lower end of the upper bead breaker column 21.

Rod 57 also pivotally supports a lever arm 59 at one end. The remaining end of lever arm 59 is pivotally connected at 60 to a rack 61 which engages a pinion gear 62 on the lower end of the shaft 23. The necessary bearings, not shown, will, of course, be provided. The rack 61 is supported by a rack guide 63 and this assembly is supported by two vertical brackets 64 and 65 welded across the frame to provide further reinforcement. For clarity, the frame is not shown in FIG. 2.

The bolt hole engaging pin 25 is also mounted on this subassembly (FIG. 3) so that it may move towards and away from shaft 23 in slot 24. However, it is provided with a collar 67 and a spring 68 so that the collar 67 is biased into engagement with the underside of the table top wall. This arrangement facilitates engagement between a wheel bolt hole and the pin.

The lower bead breaker shoe 20 as mentioned previously is pivotally mounted on rod 54. Shoe 28 has an arcuate leading edge 72 for engaging the tire bead. This leading edge 72 is on an inner portion inclined at an angle to an outer lower portion. The inner portion is indicated at 70 and the outer portion at 71. From the outer portion the pivotal connection is made through a pair of spaced apart depending brackets. The attitude of the leading edge 72 is determined by a pair of adjustable screws such as 73 which engage a plate 74 mounted on arms 41 and 42. Arms 41 and 42 ensure that the lower shoe follows a predetermined path to attack the tire bead at a proper angle. The adjustment by means of the screws provides a further adjustment.

The upper bead breaking mechanism comprises an upper bead breaking shoe 80 with a leading edge 81. Again the leading edge 81 is arcuate in plan view for engaging the upper tire bead. Leading edge 81 extends along the innermost edge of inner downwardly inclined tongue portion 82 which depends from a vertical portion 83 of the upper shoe. The vertical portion 83 is hingedly connected by pin 84 which extends through an inverted U-shaped portion 85 of the upper shoe and an upper bead breaker support arm 86. The upper bead breaker support arm 86 has an angular cut at the end thereof as at 87 and a spring 88 is mounted between the upper surface of arm 86 and the lower surface of the inverted U-shaped portion of the shoe.

Support arm 86 passes through an arm guide member 89. The arm guide member has a pin 90 fixed between the side walls of the guide members. The fit between the support arm 86 and the channel through the arm guide member is a loose sliding fit to permit the upper bead breaking shoe to be moved laterally with the support arm. However, when an upwardly directed force component is applied to the upper bead breaker shoe 80 as at F (FIG. 5), the support arm 86 is caused to move upwardly at the end on which the shoe is mounted and the upper surface of the arm is brought into sharp engagement with the upper wall of the guide member 89 and the lower surface of the arm is brought into sharp contact with the upper surface of the pin 90. This provides a binding action between the support arm 86 and the surfaces at which sharp contact occurs to provide a frictional lock which prevents the support arm 86 from moving laterally in the channel through the arm guide member.

The arm guide member 89 has a horizontally projecting square tube member 91 attached thereto which has an opening 91a through the upper surface and an opening 91b through the lower surface thereof. The openings 91a and 91b may be circular openings and are slightly larger in diameter than the diameter of the upper bead breaker column 21 so that the column passes therethrough with a sliding fit.

Figure 5:
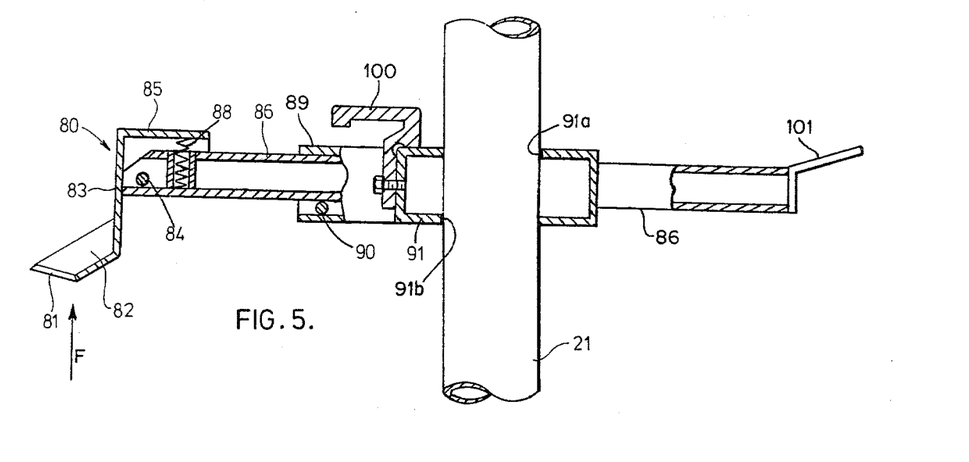
FIG. 5 is a section taken along line 5—5 of FIG. 4.
Figure 6:
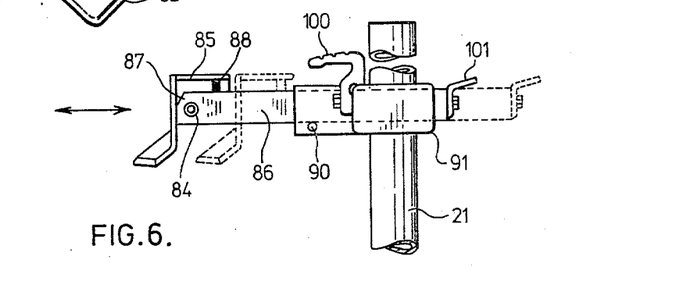
FIG. 6 is a side view of the upper bead breaker mechanism illustrated in FIG. 4 and serves to illustrate the lateral adjustment capability of the present invention.

When a vertically upward force F is directed against the upper bead breaker shoe 80 the square tube member 91 is seen to rotate in a clockwise direction about an axis disposed radially with respect to the column 21 as seen in FIG. 5. In such an instance the left side of the upper opening 91a and the right side of the lower opening 91b as shown come into sharp engagement with the outer surface of the upper bead breaker column 21. Since the areas at the edges of the openings in contact with the column are relatively small due to the relatively thin upper and lower walls of the square tube member 91, a high pressure is generated between the contacting edges of the openings and the column as the couple imposed by the upwardly directed force on the shoe is counteracted. As a consequence the edges of the openings in the square tube member 91 literally "bite" into the surface of the upper bead breaker column effecting a frictional locking engagement between the column and the square tube member. The upper bead breaker shoe 80 is thereby prevented from moving vertically on the bead breaker column.

At rest the engagement between the bead breaker column 21 and the square guide tube 91 also provides a frictional lock therebetween as the weight of the shoe 80 tends to tilt the square tube member 91 in a counterclockwise direction as seen in FIG. 5. In such an instance the right side of the upper opening 91a and the left side of the lower opening 91b are brought into sharp contact with the column 21 to provide the "biting" action and corresponding vertical locking function as hereinbefore described for an upwardly directed force on the upper bead breaking shoe. A pair of handles such as 100 and 101 attached to the square tube member 91 and the upper bead breaker support arm 86 respectively provide easy adjustment of the upper bead breaker assembly on the bead breaker column 21 without the necessity for adjustment of any mechanical locks or screws. By simply lifting the handle 100 when the upper bead breaking assembly is at rest to thereby slightly rotate the assembly in a clockwise direction as seen in FIG. 5 the friction lock between the edges of the openings 91a and 91b and the column 21 is broken. In this fashion the upper bead breaker assembly may be adjusted in an infinite variety of positions vertically on the upper bead breaker column 21.

Upper bead breaker column 21 is pivotally mounted adjacent its lower end to the upper bead breaker levers 39 and 40 through rod 58 and intermediate its length by rod 96 to guide arms 43 and 44 which are themselves pivotally mounted on the frame through rod 36.

Figure 3:
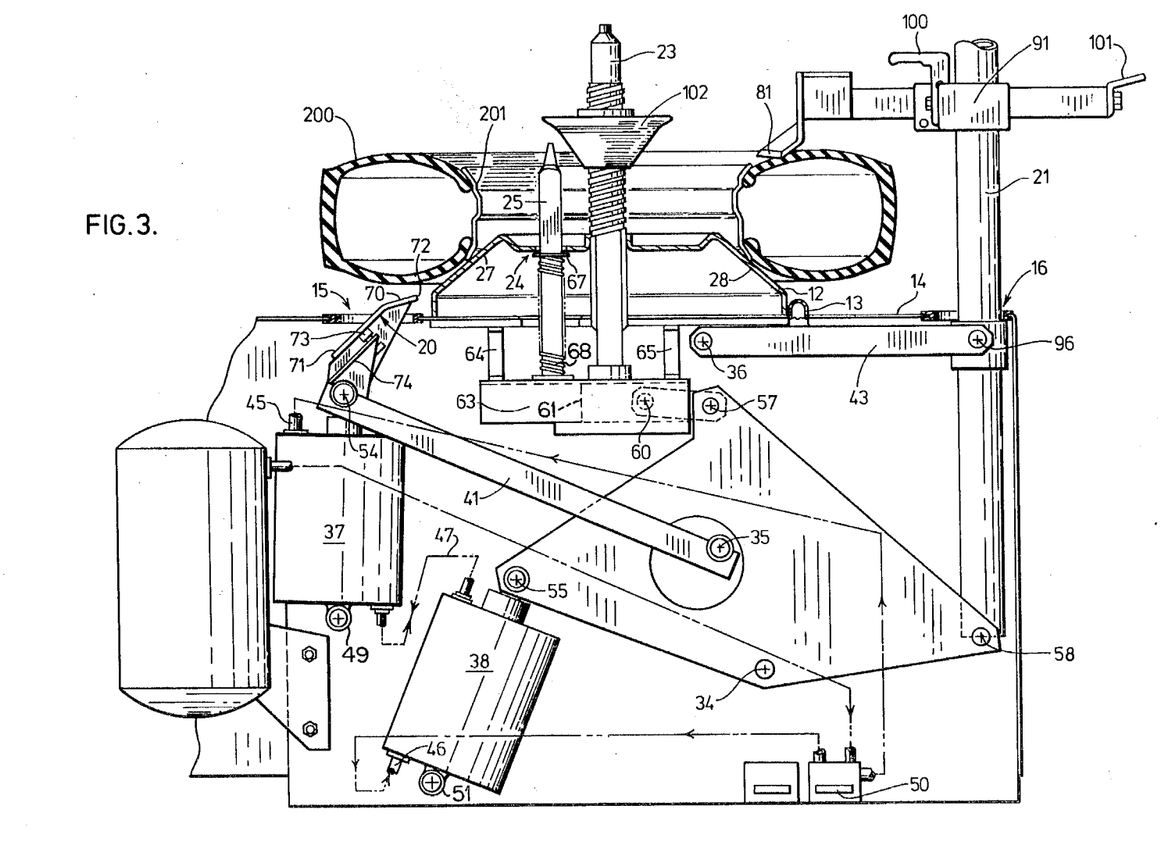
FIG. 3 is a diagrammatic sectional view taken along line 3—3 of FIG. 1 and shows a tire changer in accordance with the present invention with a tire on a wheel rim mounted thereon prior to removal of the tire.

It is to be noted that the pivotable connections to rods 96 and 36, as is evident from FIG. 3 are in substantially the same horizontal plane. It is also to be noted that the pivot point of rod 58 is initially, as shown in FIG. 3, above the pivot point of upper bead breaker levers 39 and 40. The upper bead breaker levers pivot about the rod 34 which is in a plane below that of the rod 58.

The significance of these relationships will be more apparent from the description of the action and motion of the upper bead breaker assembly which will be described presently. But it should be appreciated that the initial motion of the upper bead breaker shoe 80 will be inward and downward into the wheel drop centre in contrast to those upper bead breaker mechanisms of the prior art which are downward and outward.

It will be apparent that the facility of adjusting the upper bead breaker shoe and the engagement with the column 21 permits the upper bead breaker shoe assembly to swing around to give clear access to the deck and wheel mount platform 12.

In the drawings a tire 200 mounted on a wheel rim 201 is placed on platform 12. Shaft 23 passes through the hub hole in the wheel rim and pin 25 passes through a bolt hole. A cone 102 threaded onto shaft 23 holds the wheel rim 201 down and pin 25 prevents relative rotation.

The platform 12 will accommodate wheel rims from 10-inch diameter up to 17½-inch diameter. The position of the wheel rim on the platform 12 will of course depend on its diameter, the largest diameter wheel sits lowest down on platform 12 while the smallest diameter wheel will sit higher up the platform.

It will be understood that the operator, depending on the wheel rim flange size and the diameter of the wheel, will have adjusted the attitude of the leading edge 72 of the lower bead breaking shoe 20 by adjusting screws 73 so as to vary the distance between the shoe 20 and the shoe support plate 74. It will also be noted that the shoe support 74 is considerably shorter than the bead breaking shoe 20 and has no bead breaking function.

The operator then adjusts the upper bead breaking shoe 80 so that the leading edge thereof, 81, is resting on the tire 200 adjacent the upper bead in the manner shown in FIG. 3.

It will be apparent from the description of the upper bead breaker shoe assembly that effecting proper engagement between the upper bead breaking shoe and the tire bead is simple and easy. For a height adjustment, depending on the wheel width, the operator simply grips handle 100 and tilts it clockwise from the position shown in FIG. 5, thus releasing the friction lock between the square tube member 91 and the column 21 and moves the assembly vertically to the required position on the column 21. The square tube member may for facility be designated a column lock member. At the selected position the operator merely releases the handle 100 and again the column lock member 91 is frictionally engaged with column 21 as hereinbefore described.

Similarly, to adjust the upper bead breaker shoe laterally the operator merely lifts handle 101 and moves the upper bead breaker shoe support arm 86 horizontally. The frictional engagement between the arm 86 and both the pin 90 and the arm guide 89 is released by the lift applied to the handle 101 and when the shoe is in the selected lateral position after movement and handle 101 is released there will be no relative movement between the tire 200, shoe 80 and column 21. After the tire has been secured on the table 12 and the shoe positions adjusted the operator then operates foot pedal 50 and actuates the air/hydraulic cylinders 37 and 38.

Figure 10:
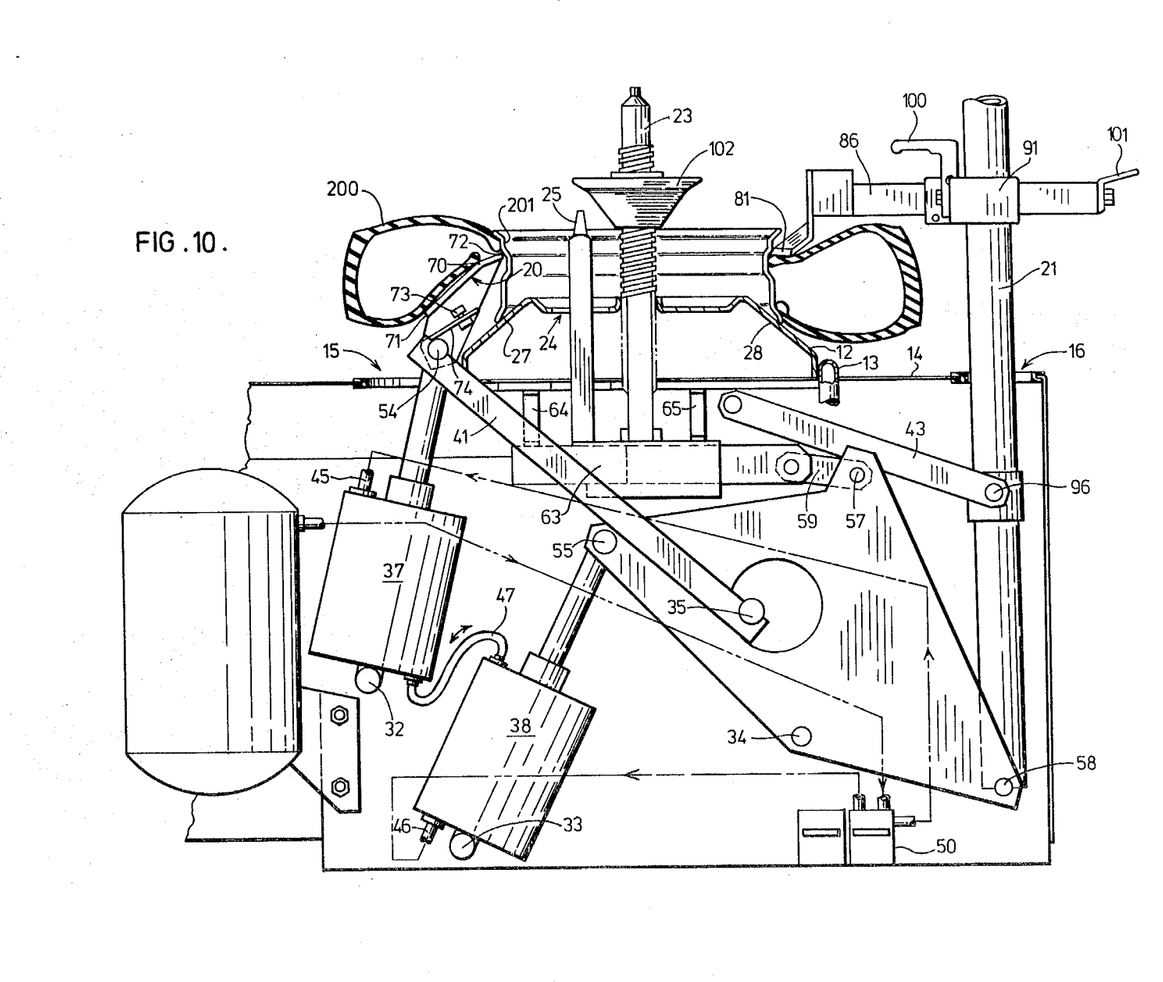
FIG. 10 is a side view partly in section illustrating the completion of the bead-breaking action and the relationship of the various parts of the machine at this point of operation.

Initially the air supplied to cylinder 38 causes piston rod 53 to extend and the oil above the piston passes into cylinder 37 and causes the air above the piston to be expelled and piston rod 52 to be extended. Because rods 52 and 53 are respectively pivotally connected to the lower bead breaking shoe 20 and the upper bead breaker levers 39 and 40, and their respective cylinders are pivotally connected to rods 32 and 33 the levers and shoes will be caused to move to assume the positions shown in FIG. 10.

As piston rod 52 of cylinder 37 extends the lower bead breaker shoe 20 pivotally mounted on rod 54 and guide arms 41 and 42 moves up and about the pivot provided by rod 35. Arms 41 and 42 cause shoe 20 and its leading edge 72 to move through an arc initially. The arc of the leading edge 72 will of course vary depending upon the relationship of the shoe to its support 74. However, the lowest setting in this relationship will ensure that a ⅜-inch rim is cleared at the upper point of prospective engagement.

As the arms 41 and 42 move round and piston 52 is extended the shoe 20 engages the side wall not with its leading edge 72 but so engages that the leading edge is free to engage the lower tire bead. Since pivot 35 is below pivot 54, the locus of the lower bead breaker shoe will be inward towards the wheel rim drop centre.

As the shoe 20 engages the tire side wall it will slowly move away from its support 74 and then the leading edge moves in towards the bead. The further the travel the more leading edge 72 of the lower bead breaker shoe can follow the wheel rim wall.

Figure 11:
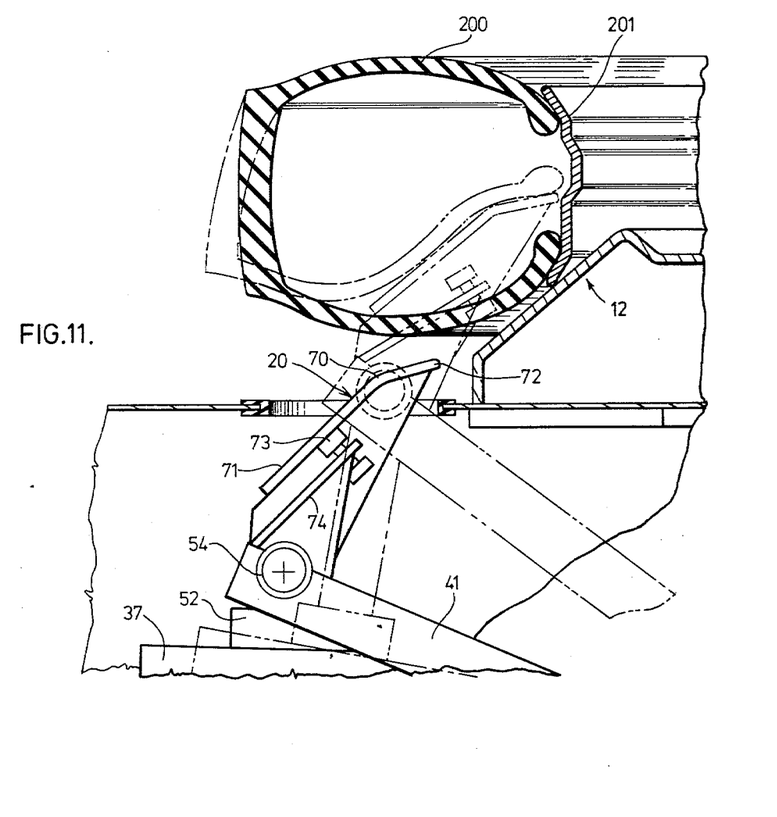
FIG. 11 is an enlarged diagrammatic sectional view of a lower bead shoe in relation to a tire and serves to illustrate its method of operation.

This action is shown in FIG. 11 where the initial starting position of the various components is shown in solid outline and the final position is shown in dotted outline. The upper and lower bead breakers in the present machine operate on diametrically opposite tire beads so that there is additional resistance to assist in breaking the bead on the side to which pressure is being applied.

Figure 7:
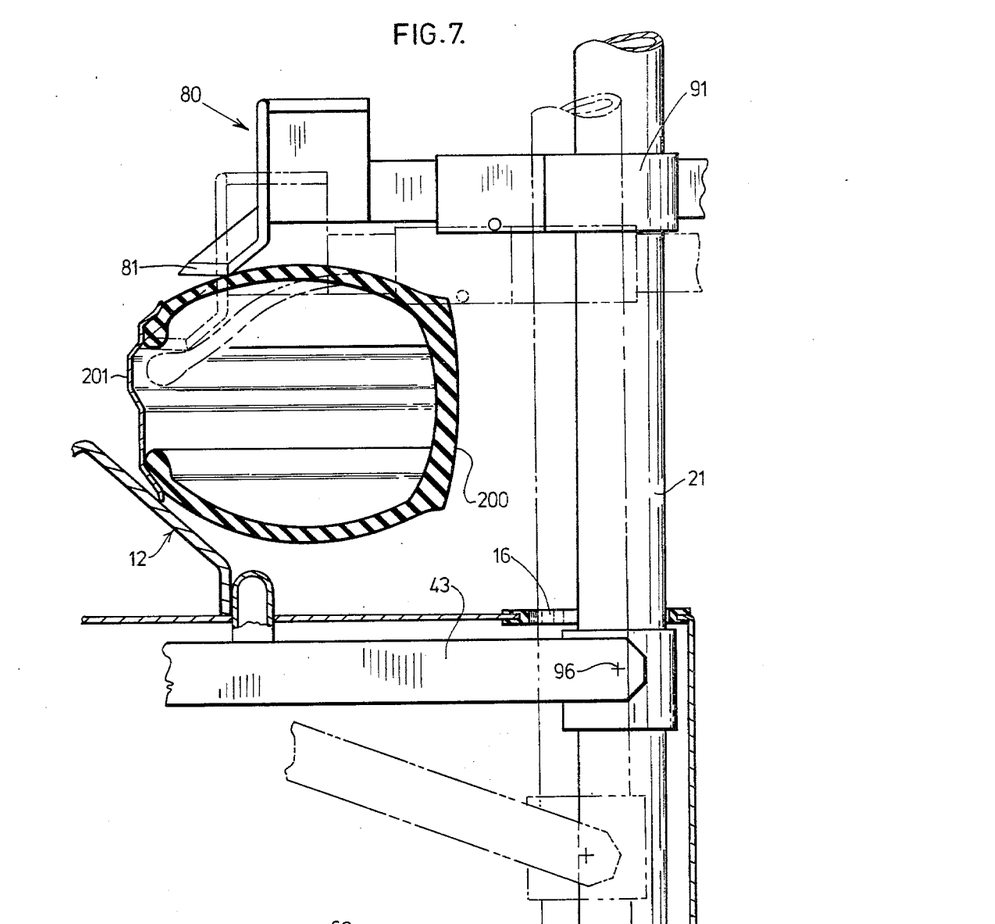
FIG. 7 is an enlarged side view of an upper bead breaker mechanism in accordance with the present invention illustrating the relationship of the upper bead breaker shoe, a tire, wheel rim and the upper part of the tire-changing during the initial part of the travel of the upper bead breaker shoe.
Figure 8:
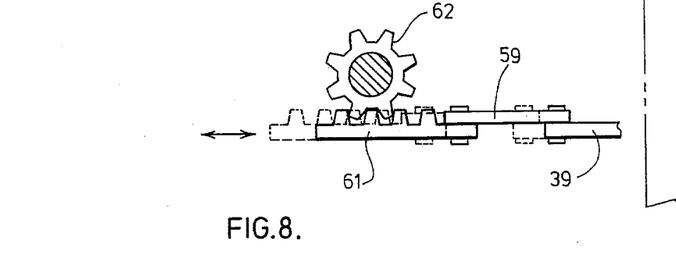
FIG. 8 is a partial plan view partly in section illustrating the relationship between the central shaft and the rack and pinion gear for driving the shaft.
Figure 9:
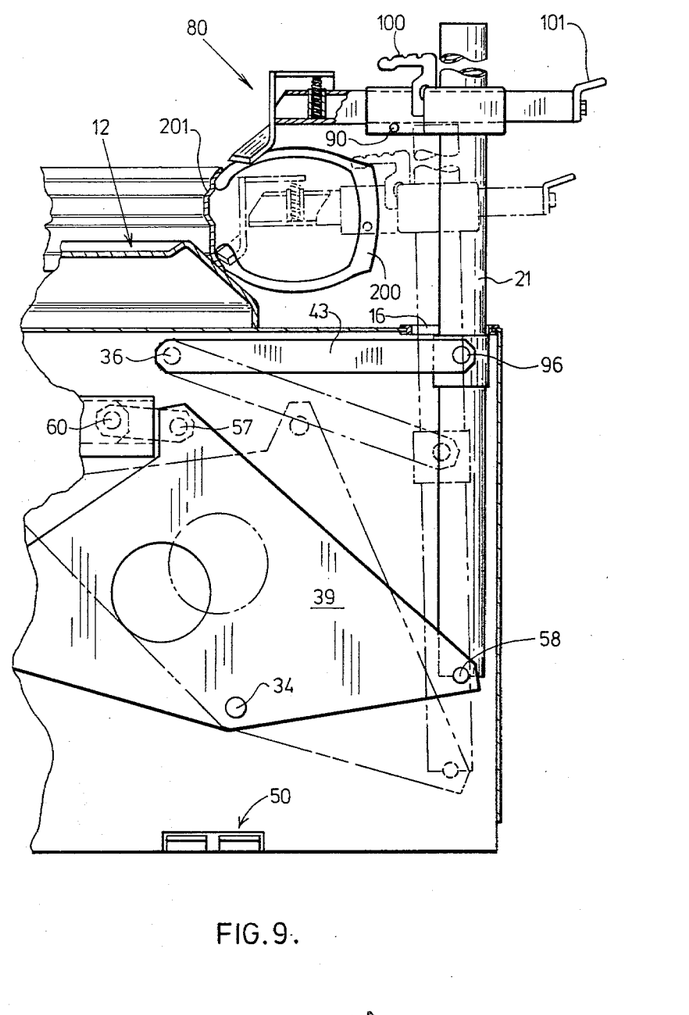
FIG. 9 is a side view partly in section illustrating the travel and motion of the upper bead breaker mechanism relative to the tire, wheel rim and its actuating lever.

As piston 52 extends so simultaneously does piston 53. This action causes plates or levers 39 and 40 to rotate about pivot 34. With this pivoting action the lower end of column 21 through pivot 58 is caused to move outwardly at first then inwardly and downwardly. This action is illustrated in FIG. 9. At the same time guide arms 44 and 43 through pivots 36 and 96 cause column 21 to rotate inward so that the coaction of the guide means 43 and 44 and levers 39 and 40 is to cause the upper part of column 21 to move inward and downward initially and to then continue downward and inward subsequently. This action is illustrated in FIGS. 7 and 9 where the initial starting position is illustrated in solid outline and a subsequent position is shown in dotted outline.

As mentioned in the structural description the upper bead breaker shoe is pivotally mounted on the upper bead breaker shoe support arm 86. As column 21 moves down there is an initial pivotal movement of shoe 80 about its pivot 84 and the leading edge 81 will be caused to move in towards the bead slightly against the resilience of spring 88. As the downward inward motion continues this pressure engagement against the tire wall and the bead is maintained and the bead is broken.

At the breaking point the pressure on the shoe is released and the travel of the upper bead breaker column 21 need not be maintained.

At this point the upper bead breaker shoe may be lifted up the column 21 and swung to the side. As upper bead breaker arms 39 and 40 move down lever 59 through pivot 57 is pulled down and rack 61 is pulled out towards the right in the drawings. The engagement between rack 61 and pinion gear 62 causes shaft 23 to rotate.

In a manner similar to machines of the prior art the operator then inserts a bead-breaking tool under the tire bead and over shaft 23. The foot pedal 50 is depressed and shaft 23 rotated in the manner just described. If the tool is stuck he then reverses the mechanism by operation of the foot pedal and the same power as was applied during the initial cycle is applied in reverse and the tool will be freed without difficulty or danger.

The tire-remounting operation is accomplished in the reverse manner and in such models as are provided with inflatable air lines 13 surrounding the lower limits of the tire-receiving platforms 12 the conical form of the platform makes for easier inflation guiding the air into the bead rather than deflecting the air as is the problem with arcuately formed tire-receiving platforms.

From the foregoing description it will be seen that an improved tire-changing machine has been provided in which the possibility of damage to magnesium and other forms of alloy wheel rims has been minimised. At the same time it will be noted that there is considerable facility in use.

The use of two power plants and the use of air/hydraulic power units provides a smoothness of operation. The air/hydraulic systems also are self-dampening so that the iregularities and unevenness of forces which occur as a result of the sudden absence of resistance when the bead is broken or there is a greater force required to break a bead are more easily absorbed by this structure. The inward travel of both upper and lower bead breaker shoes also gives an efficiency not previously attained. The absence of a necessity to compensate for outward forces on the wheel rims greatly reduces the damage on wheel rims and also leads to more efficient bead breakage. The direct vertical force with a minimal inward component does not break tire beads efficiently. This coupled with the relief from pressure when the upper bead is broken has permitted more efficient faster tire changing.

It will be understood that the specific embodiments disclosed may be varied and other mechanisms may be substituted for those described without departing from the scope of the claims appended.

The embodiments of the invention in which an exclusive property or privilege is claimed are defined as follows:

1. In a tire-changing machine having a frame, a platform for receiving a wheel rim having a drop centre mounted on top of said frame, and a rotatable shaft having a free upper end extending from said table, the improvement which comprises a pair of reversely coacting fluid motors each with pistons, the piston of a first fluid motor being operatively connected with a first bead breaker shoe and the piston of a second fluid motor being operatively connected to a second bead breaker shoe; one of said pistons being further operatively connected to said rotatable shaft to drive said shaft in first and second reverse directions about a vertical axis, and individual guide means for guiding the travel of each of said bead breaker shoes in a locus inward toward said wheel rim drop centre.

2. A tire-changing machine as claimed in claim 1 wherein said power means comprises a pair of hydraulic motors, a first hydraulic motor being operatively connected to said lower bead breaking shoe; and a second hydraulic motor operatively connected to upper bead breaking shoe, one of said motors being operatively connected to a centre post driving means to drive said centre post in a first direction and a second reverse direction.

3. A tire-changing machine as claimed in claim 2 wherein said first hydraulic motor is operatively connected to said upper bead breaker and to said centre shaft drive mechanism.

4. A tire-changing machine as claimed in claim 2 in which said centre post driving means comprises a pinion gear and a rack gear engageable therewith, said rack being movable in response to actuation of said upper bead breaker mechanism.

5. A tire-changing machine comprising
a frame mounting a wheel rim in a generally horizontal position,
an upper bead breaker support column mounted generally vertically in said frame,
an upper bead breaker shoe,
means for mounting said shoe to said support column so that said shoe extends generally laterally therefrom,
said mounting means comprising
a column lock member having an upper wall and a lower wall spaced from said upper wall,
said walls each having a thickness significantly less than the spacing therebetween,
said walls having aligned apertures therein which are slightly larger than a cross section of said support column for receiving said column therethrough, and
a bead breaker shoe support arm having said shoe attached to one end thereof,
said column lock member having a generally horizontal channel therethrough formed to accept said shoe support arm for slidable engagement therein, whereby said shoe is adjustable in lateral position ralative to said support column.

6. In combination with a tire changing machine of the type wherein a framework supports a wheel rim receiving platform adapted to receive and secure a wheel rim thereon, wherein a bead breaker mechanism includes a bead breaker shoe, and wherein the shoe is operatively connected to a bead breaker lever so that the bead of a tire mounted on the rim may be engaged by the shoe and broken away from the rim, the improvement comprising
a bead breaker shoe support arm having the shoe fastened to one end thereof,
a bead breaker column lock member having a first opening therethrough in which said shoe support arm is slidably engaged, so that said support arm is adjustable in lateral position, and a bead breaker support column pivotally connected to the bead breaker lever at one end, said column lock member having second and third openings therethrough in the upper and lower surfaces thereof respectively through which said support column extends in slidable engagement with the edges of said openings, so that said column lock member is adjustable in vertical position, whereby a force component applied to the shoe in a direction parallel to said support column causes opposing edges of said second and third openings to engage said support column with frictional contact sufficient to arrest motion of said column lock member therealong.

7. In combination with a tire changing machine of the type wherein a framework resting on an underlying surface supports a wheel rim receiving platform adapted to receive and secure a wheel rim thereon and wherein an upper bead breaker mechanism includes an upper bead breaker shoe, the upper shoe being operatively connected to an upper bead breaker driver through an upper bead breaker actuation lever so that a tire mounted on the rim may be engaged by the shoe and broken away from the rim, the improvement comprising a column lock member having a first channel therethrough with a generally horizontally disposed axis and a second channel therethrough with a generally vertically disposed axis, an upper bead breaker support arm disposed for a loose sliding fit in said first channel and adapted to have the upper bead breaker shoe affixed to one end thereof, so that when said support arm is manually engaged it may be laterally positioned in said first channel, and an upper bead breaker column pivotally connected to the upper bead breaker actuation lever and disposed for a loose sliding fit in said second channel, so that when said column lock member is manually engaged it may be vertically positioned on said bead breaker column, whereby a substantially vertical upwardly directed force at the upper bead breaker shoe frictionally fixes both said upper bead breaker support arm and column to said column lock member.

8. In combination with a tire changing machine of the type wherein a framework supports a wheel rim receiving platform adapted to receive and secure a wheel rim thereon, wherein a bead breaker mechanism includes a bead breaker shoe, and wherein the shoe is operatively connected to a bead breaker drive lever so that the bead of a tire mounted on the rim may be engaged by the shoe and broken away from the rim, the improvement comprising a bead breaker shoe support arm having the shoe fastened to one end thereof, a bead breaker column lock member having a channel therethrough in which said shoe support arm is slidably engaged, so that said support arm is adjustable in lateral position to bring the shoe to overlie the tire bead, and a bead breaker support column providing a mount for said column lock member and being pivotally connected to the bead breaker drive lever at one end, so that a force component applied to the shoe in a direction parallel to said support column causes a friction force between said lock member and said shoe support arm sufficient to arrest motion of said shoe support arm in said channel.

9. The combination of claim 8 together with means for pivotally connecting said bead breaker support column to the framework at a point intermediate the ends of said column, said pivotal connection between said bead breaker support column and the drive lever being positioned so that initial drive lever motion moves said connection downwardly and outwardly, whereby the shoe moves downwardly and inwardly toward the wheel rim drop center.

10. In combination with a tire changing machine of the type wherein a framework supports a wheel rim receiving platform adapted to receive and secure thereon a wheel rim having a drop center, wherein upper and lower bead breaker mechanisms including upper and lower bead breaker shoes are supported by the framework, the upper and lower shoes being connected to upper and lower bead breaker levers respectively so that a tire may be engaged by the shoes and broken away from the rim, the improvement comprising a lower bead breaker shoe actuator including a cylinder together with a piston disposed for longitudinal movement therein, said lower actuator piston being coupled to the lower bead breaker lever so that the lower shoe is driven toward and away from the rim drop center, an upper bead breaker shoe actuator including a cylinder together with a piston disposed for longitudinal movement therein, said upper actuator piston being coupled to the upper bead breaker lever so that the upper shoe is driven toward and away from the rim drop center, and means for coupling said lower actuator cylinder to said upper actuator cylinder and for limiting the speed of movement of said upper and lower actuator pistons.

11. The combination of claim 10 wherein said pistons are driven one way to extend the upper and lower shoes toward the wheel rim drop center and the opposite way to retract the shoes and wherein said means for coupling and for limiting comprises a fluid mass extending between said actuators and a restriction in the path of said fluid mass.

12. In combination with a tire changing machine of the type wherein a framework supports a wheel rim receiving platform adapted to receive and secure thereon a wheel rim having a drop center, wherein upper and lower bead breaker mechanisms including upper and lower bead breaker shoes are supported by the framework, the upper and lower shoes being connected to upper and lower bead breaker levers respectively so that a tire may be engaged by the shoes and broken away from the rim, the improvement comprising, a lower bead breaker driving cylinder, a lower bead breaker driving piston disposed for longitudinal movement within said lower cylinder, said lower piston being connected to drive the lower bead breaker lever, an upper bead breaker driving cylinder, an upper bead breaker driving piston disposed for longitudinal movement within said upper cylinder, said upper piston being connected to drive the upper bead breaker lever, and a restricted conduit extending between said driving cylinders and communicating one side of said lower piston with one side of said upper piston, whereby force applied against the other side of alternate ones of said pistons provides damped upper and lower bead breaker shoe movement toward and away from the rim drop center.

* * * * *